Patented Dec. 15, 1931

1,836,182

UNITED STATES PATENT OFFICE

WILHELM NEELMEIER AND EUGEN GLIETENBERG, OF LEVERKUSEN-ON-THE-RHINE, GERMANY, ASSIGNORS TO GENERAL ANILINE WORKS, INC., OF NEW YORK, N. Y., A CORPORATION OF DELAWARE

MONOAZODYESTUFFS

No Drawing. Application filed March 1, 1929. Serial No. 343,842, and in Germany March 2, 1928.

The present invention relates to monoazodyestuffs, more particularly, it relates to dyestuffs of the general formula:

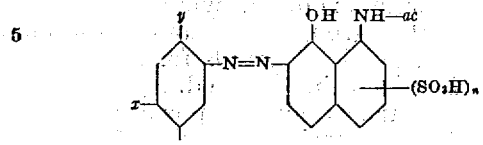

wherein one $x$ stands for an acidyl-amino group, such as $-NH-COCH_3$, $-NHCO-C_6H_5-$, the other $x$ stands for an alkoxy-, aralkoxy-, aryloxy- or a methyl-group, and $y$ stands for an alkoxy-, aralkoxy-, aryloxy- or a methyl-group, but only one of the symbols $x$ and $y$ being a methyl-group, "ac" stands for an acidyl-group, and "n" stands for one of the numbers 1 and 2.

Our new compounds are obtainable by diazotizing in the usual manner with sodium nitrite and hydrochloric acid an amine of the general formula:

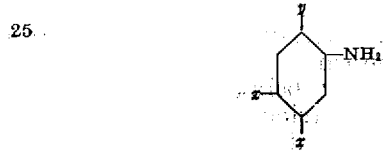

wherein one $x$ stands for an acidyl-amino group, the other $x$ stands for an alkoxy-, aralkoxy-, aryloxy- or a methyl-group, and $y$ stands for an alkoxy-, aralkoxy-, aryloxy- or methyl-group, but only one of the symbols $x$ and $y$ being a methyl-group, and introducing the diazo solution into an alkaline solution of a peri-acidyl-amino-naphthol-sulfonic acid of the general formula:

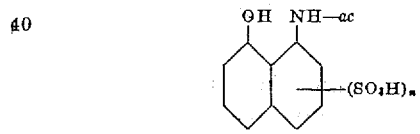

wherein "ac" stands for an acidyl group, for example for an acetyl- or benzoyl-group, and "n" stands for one of the numbers 1 and 2, while stirring; when the coupling is complete, the dyestuff is isolated in the usual manner.

The new dyestuffs are in the dry pulverized form dark, various colored powders, which are soluble in water, and which dye wool from an acid bath clear reddish violet to greenish blue shades. The dyeings are distinguished by their evenness and fastness to alkalies and acids, besides they are fast to light, washing and hot-pressing.

The invention is illustrated by the following examples, but is not restricted thereto:

*Example 1.*—210 parts by weight of 5-acetamino-2-amino - 1.4 - dimethoxybenzene are dissolved in water with the addition of hydrochloric acid and diazotized with sodium nitrite in the usual manner. The diazo solution is slowly introduced into a solution of 405 parts by weight of the sodium salt of 1-acetamino-8-hydroxy-naphthalene-3.5-disulfonic acid in aqueous pyridine. The coupling is complete in a short time. The solution of the dyestuff is diluted with water, and the dyestuff is salted out and filtered. In the free state the dyestuff has probably the following formula:

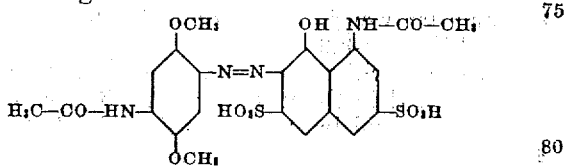

If instead of pyridine, soda or sodium bicarbonate is used in the coupling process, the coupling proceeds somewhat more slowly.

The new dyestuff dyes wool from an acid bath clear even reddish-blue shades of good fastness to carbonization, light, washing and hot-pressing.

If in the above example the acetyl residue of the 1-acetylamino-8-hydroxy-naphthalene-3.6-disulfonic acid is replaced by a carbethoxy-$(COOC_2H_5)$, chloro-acetyl-, $\beta$-chloro-propionyl-, phenylacetyl- or a substituted or unsubstituted benzoyl-residue, dyestuffs of the same properties, dyeing wool more red or more blue, according to the specific acidyl-residue used, are obtained.

*Example 2.*—A diazo solution prepared in the usual manner from 210 parts by weight of 6-amino-4-acetylamino-1.3-dimethoxy-benzene are introduced into a soda alkaline solution of 361 parts by weight of 1-acetamino-8-hydroxy-naphthalene-3.6-disulfonic acid. when the coupling is finished, the dyestuff is salted out, filtered and dried. The new dyestuff dyes wool from an acid bath powerful even clear violet shades of good fastness to carbonization, light, washing and hot-pressing.

If the acetyl-residue of the 6-amino-4-acetamino-1.3-dimethoxybenzene is replaced by any other acidyl-residue, for example, by a benzoyl-, a β-chloro-ethane-sulfo-, a toluene-sulfo- or similar residues, dyestuffs of the same fastness properties, dyeing wool more red or more blue, varying with the specific acidyl-residues used, are obtained.

*Example 3.*—194 parts by weight of 4-methoxy-5-acetamino-2-amino-1-methylbenzene are dissolved and diazotized in the usual manner. The diazo solution is slowly introduced while stirring into a soda alkaline solution of 361 parts by weight of 1-acetamino-8-hydroxynaphthalene-3.6-disulfonic acid. When the diazo compound can no more be detected, the dyestuff is isolated in the usual manner. It dyes wool from an acid bath in very clear even reddish violet shades, of good fastness to carbonization, light, washing and hot-pressing.

If the acetyl-residues of the two components are replaced by any other acidyl residue, dyestuffs of the same fastness properties are obtained.

*Example 4.*—The diazo compound prepared from 272 parts by weight of 5-amino-4-phenoxy-2-acetylamino-1-methoxybenzene are coupled with an aqueous solution of 361 parts by weight of 1-acetamino-8-hydroxy-naphthalene-3.6-disulfonic acid in the presence of pyridine or soda. The new dyestuff is isolated in the usual manner, it dyes wool from an acid bath clear bluish violet shades of good fastness to carbonization, light, washing and hot pressing.

If the phenoxy-residue of the diazotizing component is substituted by a benzyl-hydroxy-residue, a dyestuff is obtained, dyeing wool more blue. If the diazo compound prepared from 5-amino-4-phenoxy-2-acetylamino-1-methoxybenzene is coupled in an alkaline medium with 1-(β-chloroethanesulfo)-amino-8-hydroxynaphthalene-3.6-disulfonic acid, a dyestuff, dyeing reddish-blue shades, is obtained. By coupling of 1-(4'-toluene-sulfo)-amino-8-hydroxynaphthalene-3.6-disulfonic acid with the diazo compound from 5-amino-4-ethoxy-2-acetylamino-1-methoxybenzene a dyestuff, dyeing wool similar shades is obtained; its solubility can be increased by substituting the 1-(4.-toluenesulfo)-amino-8-hydroxynaphthalene-3.6-disulfonic acid by the 1-(5'-acetylamino-2'-methylbenzenesulfo)-amino-8-hydroxynaphthalene-3.6-disulfonic acid.

We claim:

1. As new products monoazo dyestuffs of the probable general formula:

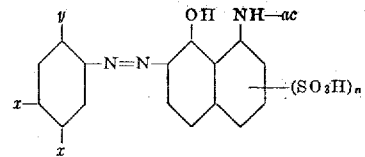

wherein one $x$ stands for an acidylamino group, the other $x$ stands for a substituent of the group consisting of the alkoxy-, aralkoxy-, aryloxy- and methyl-groups, $y$ stands for a substituent of the group consisting of the alkoxy-, aralkoxy-, aryloxy-, and methyl-groups, but only one of the symbols $x$ and $y$ being a methyl-group, "$ac$" stands for an acidyl residue, and "$n$" stands for one of the numbers 1 and 2, being in the dry pulverized form dark, various colored powders, soluble in water and dyeing wool from an acid bath even clear reddish violet to greenish-blue shades of good fastness to alkalies, acids, light, washing and hot-pressing.

2. As new products monoazo dyestuffs of the probable general formula:

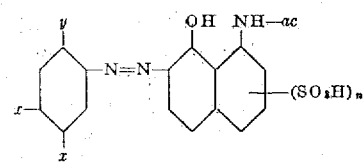

wherein one $x$ stands for an acidylamino group, the other $x$ and $y$ stand for substituents of the group consisting of the alkoxy-, aralkoxy-, and aryloxy-groups, "$ac$" stands for an acidyl group and "$n$" stands for one of the numbers 1 and 2, being in the dry pulverized form dark, various colored powders, soluble in water and dyeing wool from an acid bath even clear reddish violet to greenish blue shades of good fastness to alkalies, acids, light, washing and hot-pressing.

3. As new products monoazo dyestuffs of the probable general formula:

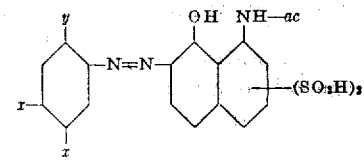

wherein one $x$ stands for an acidylamino group, the other $x$ and $y$ stand for alkoxy-groups and "$ac$" stands for an acidyl residue, being in the dry pulverized form dark, various colored powders, soluble in water and dyeing wool from an acid bath even clear reddish violet to greenish blue shades of good fastness to alkalies, acids, light, washing and hot-pressing.

4. As new products monoazo dyestuffs of the probable general formula:

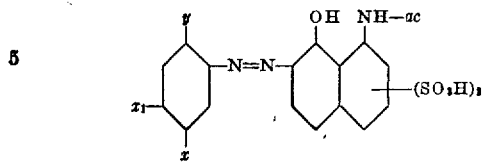

wherein $x_1$ stands for an acidylamino group, the other $x$ and $y$ stand for alkoxy-groups and "ac" stands for an acidyl-residue, being in the dry pulverized form dark, various colored powders, soluble in water and dyeing wool from an acid bath even clear reddish violet to greenish blue shades of good fastness to alkalies, acids, light, washing and hot-pressing.

5. As a new product the monoazo dyestuffs of the formula:

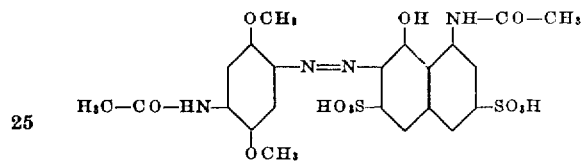

dyeing wool from an acid bath clear even reddish-blue shades of good fastness to carbonization, light, washing and hot-pressing.

In testimony whereof we have hereunto set our hands.

WILHELM NEELMEIER. [L. S.]
EUGEN GLIETENBERG. [L. S.]

4. As new products monoazo dyestuffs of the probable general formula:

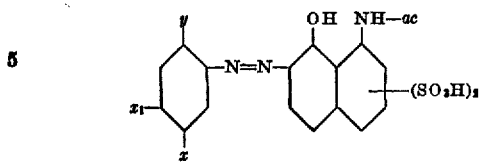

wherein $x_1$ stands for an acidylamino group, the other $x$ and $y$ stand for alkoxy-groups and "$ac$" stands for an acidyl-residue, being in the dry pulverized form dark, various colored powders, soluble in water and dyeing wool from an acid bath even clear reddish violet to greenish blue shades of good fastness to alkalies, acids, light, washing and hot-pressing.

5. As a new product the monoazo dyestuffs of the formula:

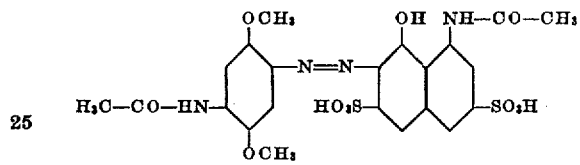

dyeing wool from an acid bath clear even reddish-blue shades of good fastness to carbonization, light, washing and hot-pressing.

In testimony whereof we have hereunto set our hands.

WILHELM NEELMEIER. [L. S.]
EUGEN GLIETENBERG. [L. S.]

---

CERTIFICATE OF CORRECTION.

Patent No. 1,836,182.  Granted December 15, 1931, to

WILHELM NEELMEIER ET AL.

It is hereby certified that error appears in the printed specification of the above numbered patent requiring correction as follows: Page 1, line 68, for "naphthalene-3.5-di-" read naphthalene-3.6-di-; and that the said Letters Patent should be read with this correction therein that the same may conform to the record of the case in the Patent Office.

Signed and sealed this 29th day of March, A. D. 1932.

(Seal)

M. J. Moore,
Acting Commissioner of Patents.

CERTIFICATE OF CORRECTION.

Patent No. 1,836,182.    Granted December 15, 1931, to

WILHELM NEELMEIER ET AL.

It is hereby certified that error appears in the printed specification of the above numbered patent requiring correction as follows: Page 1, line 68, for "naphthalene-3.5-di-" read naphthalene-3.6-di-; and that the said Letters Patent should be read with this correction therein that the same may conform to the record of the case in the Patent Office.

Signed and sealed this 29th day of March, A. D. 1932.

(Seal)

M. J. Moore,
Acting Commissioner of Patents.